N. & L. NILSON.
TRACTION MACHINE.
APPLICATION FILED NOV. 16, 1914.

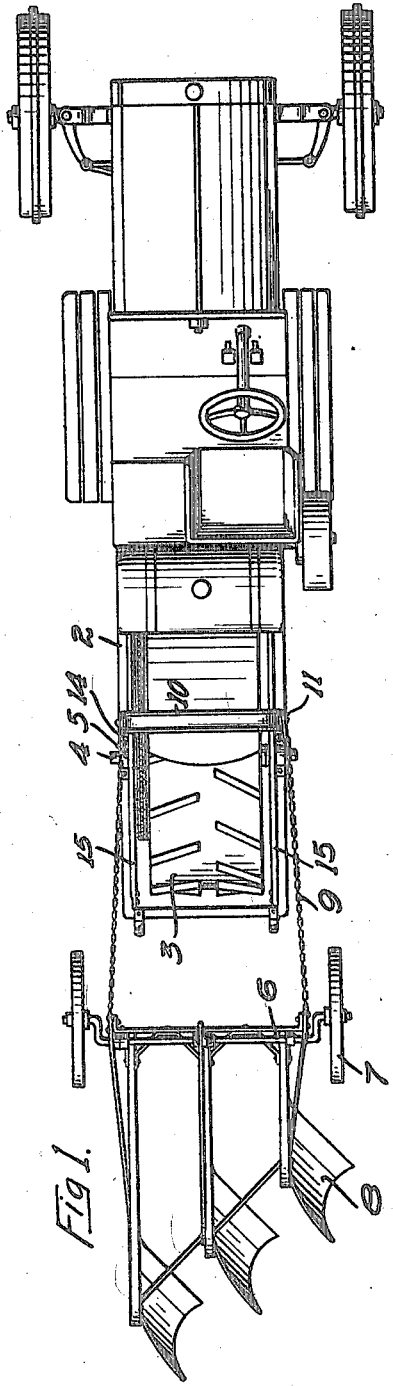

1,164,309.

Patented Dec. 14, 1915.
2 SHEETS—SHEET 2.

INVENTORS
NILS NILSON
LEONARD NILSON
BY Paul & Paul
ATTORNEYS

WITNESSES

UNITED STATES PATENT OFFICE.

NILS NILSON AND LEONARD NILSON, OF WAYZATA, MINNESOTA.

TRACTION-MACHINE.

1,164,309.  Specification of Letters Patent.  Patented Dec. 14, 1915.

Application filed November 16, 1914. Serial No. 872,376.

*To all whom it may concern:*

Be it known that we, NILS NILSON and LEONARD NILSON, citizens of the United States, residents of Wayzata, county of Hennepin, State of Minnesota, have invented certain new and useful Improvements in Traction-Machines, of which the following is a specification.

The object of our present invention is to provide a draft connection between the agricultural implement, such as a group of plows, and the traction frame which will provide for a variation in the leverage of the draft connection on the frame according to the number of plows used or the character of the ground in which the machine is working.

A further object is to provide an attachment by means of which the lifting leverage of the draft connections on the forward portion of the machine frame can be varied as desired, or as conditions may require.

A further object is to provide a draft connection that is capable of convenient and rapid adjustment in the field.

The invention consists generally in various constructions and combinations, all as hereinafter described and particularly pointed out in the claims.

Figure 3:
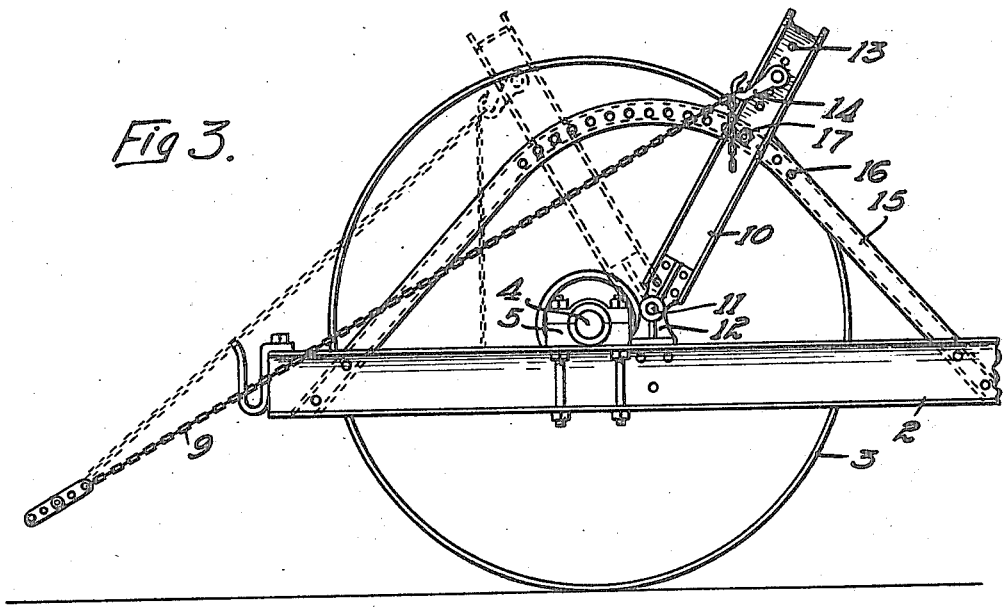
Figure 4:
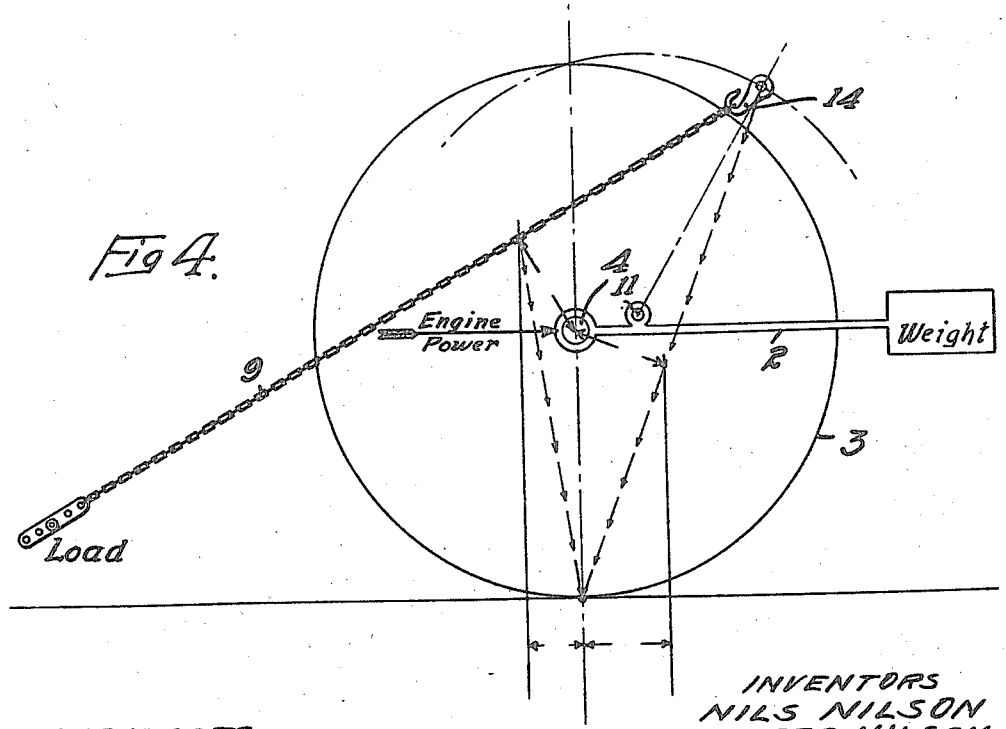

In the accompanying drawings forming part of this specification, Figure 1 is a plan view of a traction machine and draft connection embodying our invention, Fig. 2 is a side elevation of the same, Fig. 3 is a side elevation of the rear portion of the machine, illustrating the draft connection in detail and the manner of adjusting it to vary the leverage on the machine frame, Fig. 4 is a diagrammatic view illustrating the adjustment of the draft attaching means to vary the downward pressure of the connections thereon and the lifting force of the draft connections on the forward portion of the machine.

In the drawing, 2 represents the frame of the traction machine to which, in this application, we make no claim, and 3 a traction wheel mounted on an axle 4, which has bearings at 5 on the side rails of the machine frame.

6 represents a plow frame having wheels 7 and connected to a group of plows 8 in any suitable or preferred manner.

9 represents flexible draft connections, preferably chains, extending forward from the plow frame.

10 is a yoke, U-shaped, substantially, in form, and pivotally supported at 11 on each side of the traction wheel upon bearings 12. These bearings are preferably located in front of and near the axle of the traction wheel, the yoke being of sufficient height to straddle the wheel and clear it throughout the range of adjustment of the yoke. The yoke is preferably provided with a series of holes 13 in its legs in which hooks 14 are adjustably mounted, these holes being arranged in rows opposite, preferably, the top of the wheel and the adjustment of the hooks therein serves to raise or lower the point of connection of the draft chains with the yoke to vary the leverage or the lifting power of the draft connections on the forward portion of the machine. These chains 9 extend up on each side of the wheel and are engaged with the hooks, the pull of the chains exerting a downward pressure on the yoke and increasing the traction of the wheel as described in our pending applications for Letters Patent of the United States.

It is sometimes desirable to change the position of the yoke with respect to the traction wheel for the purpose of increasing or decreasing the leverage, and with this end in view we provide arched bars 15 on each side of the traction wheel and having their lower ends rigidly secured to the machine frame, the upper portions of said bars being opposite, substantially, the top of the wheel. These upper portions are provided with a series of holes 16 adapted to receive a bolt 17 which passes through a hole in the yoke and one of the holes in the bars, according to the adjustment of the yoke, the holes in the bars being, of course, on the arc of a circle whose radius is the center of the yoke, and consequently, as the yoke is swung back and forth, the hole therein will register with each one of the holes 16 successively as the yoke is moved.

When the yoke is in the position indicated by full lines in Fig. 3, the pull will be downward and backward, pressure being applied partly through the pivots of the yoke and partly through the arched bars of the machine frame and the wheel axle to force the tread of the wheel into the soil. The lines of force are indicated by the arrows and the dotted lines in Fig. 4. There will also be a tendency exerted mainly through the arched bar connection with the frame to raise the forward portion of the frame. This tendency will be less, however, owing to the forward tilting of the yoke, than when the yoke is swung to a point in the rear of its pivotal connections with the frame. When the yoke is in an upright position at right angles substantially to the machine frame, the pressure of the wheel will be downward in a vertical direction and there will also be a lifting force exerted through the arched bars to raise the forward portion of the machine. This downward pressure to increase the traction of the wheel seems to be greatest when the yoke is in a vertical position. Raising or lowering the point of attachment of the draft connections with the yoke increases or decreases the long arm of the lever and consequently increases or decreases the effective pull of the load on the lever. This power of the load will increase or decrease proportionately with the distance of the attachment of the draft connections from the pivot of the yoke, and the proper position of the hooks on the yoke can be readily determined in the field according to the number of plows to be pulled or the draft of any other implement to which the machine may be attached.

When the yoke is in the position indicated by dotted lines in Fig. 3, the lines of force will be applied in the direction of the arrows in Fig. 4 in the rear of the wheel axle. In this position the draft attaching point will be in the rear of the pivots of the yoke and a greater lifting power will be exerted through the arched bars to raise the forward portion of the machine frame. At the same time, the downward pressure will be transmitted to the wheel to increase its traction. Thus by moving the yoke back and forth on its pivots and changing the point of attachment of the draft connections therewith, we are able to readily adapt the machine for varying drafts and different conditions of the soil in which the machine may be working. It is evident that the yoke may be mounted at a different point on the machine frame and that its form may be varied in different ways, and the means for attaching the draft connections to the yoke can be changed, all without departing from the spirit of our invention.

We claim as our invention:

1. The combination, with a traction machine having forward guiding means and a rear traction wheel, of draft attaching means extending above the axis of said wheel and having means for adjusting forwardly or backwardly with respect to the axis of said wheel, and draft connections for said draft attaching means, said draft connections exerting a downward pull on said attaching means to increase the traction of said wheel.

2. The combination, with a traction machine having forward guiding means and a rear traction wheel, of a draft attaching means pivotally supported on said frame on opposite sides of said wheel, said draft attaching means having a forward and backward swinging movement, and means for locking it in its adjusted positions, and draft connections engaging said draft attaching means and operating to exert a downward pull thereon and increase the traction of said wheel.

3. The combination, with a traction machine frame having forward guiding means and a rear traction wheel, of a yoke straddling said rear traction wheel and pivotally supported on said frame, said yoke being free to tilt forward or backward with respect to said traction wheel, and means for locking it in its adjusted positions, and draft connections provided upon opposite sides of said traction wheel and engaging said draft attaching means for increasing the traction of said wheel.

4. The combination, with a traction machine having forward guiding means and a rear traction wheel, of a yoke straddling said rear traction wheel and pivotally mounted on the frame of said machine on each side of said wheel, arched bars secured to said machine frame upon opposite sides of said wheel, said bars having a series of holes therein and said yoke having holes to register successively with the holes in said bars when said yoke is swung forward or backward on its pivots, bolts for securing said bars and yoke together, and draft means connected with said yoke and operating to exert a downward pull thereon, for the purpose specified.

5. The combination, with a traction machine having forward guiding means and a rear traction wheel, of draft attaching means mounted on said machine for forward or backward tilting, means connected with the machine frame in front of the bearings of said traction wheel and having means for engagement with said draft attaching means, draft connections for said draft attaching means operating to exert a backward and downward pull thereon, and a lifting effect on the forward portion of said machine.

6. The combination, with a traction machine frame having forward guiding means and a rear traction wheel, of a yoke pivotally supported on said frame in front of and near the axle of said wheel, bars secured to said frame in front and in the rear of said yoke, means for locking said yoke and bars together at different points in the tilting movement of said yoke, draft connections having means for attachment to said yoke and operating to exert a downward pressure thereon to increase the traction of said wheel and a lifting effect through said bars on the forward portion of said frame.

In witness whereof, we have hereunto set our hands this 13th day of November, 1914.

NILS NILSON.
LEONARD NILSON.

Witnesses:
EDWARD A. PAUL,
GENEVIEVE E. SORENSEN.